United States Patent
Sivaramamurthy et al.

(10) Patent No.: US 10,523,607 B2
(45) Date of Patent: Dec. 31, 2019

(54) FRAMEWORK TO CONTROL AND MEASURE THE FLOW OF MESSAGES

(71) Applicant: Infosys Limited, Bangalore (IN)

(72) Inventors: Venkat Kumar Sivaramamurthy, Bangalore (IN); Hitesh Mathpal, Bangalore (IN)

(73) Assignee: Infosys Limited, Bangalore (IN)

( * ) Notice: Subject to any disclaimer, the term of this patent is extended or adjusted under 35 U.S.C. 154(b) by 13 days.

(21) Appl. No.: 14/562,104

(22) Filed: Dec. 5, 2014

(65) Prior Publication Data

US 2015/0180810 A1   Jun. 25, 2015

(30) Foreign Application Priority Data

Dec. 20, 2013 (IN) .......................... 5991/CHE/2013

(51) Int. Cl.
*H04L 12/58* (2006.01)
*H04L 29/08* (2006.01)
*H04L 29/06* (2006.01)

(52) U.S. Cl.
CPC ............... *H04L 51/12* (2013.01); *H04L 51/16* (2013.01); *H04L 51/34* (2013.01); *H04L 51/32* (2013.01); *H04L 67/2814* (2013.01); *H04L 67/30* (2013.01); *H04L 67/42* (2013.01)

(58) Field of Classification Search
CPC .......... H04L 51/12; H04L 51/16; H04L 51/34
See application file for complete search history.

(56) References Cited

U.S. PATENT DOCUMENTS

| | | | |
|---|---|---|---|
| 2007/0214097 A1* | 9/2007 | Parsons | G06F 17/30864 706/12 |
| 2007/0271336 A1 | 11/2007 | Ramaswamy | |
| 2009/0144392 A1* | 6/2009 | Wang | G06Q 10/10 709/217 |
| 2011/0314106 A1 | 12/2011 | Bansal et al. | |
| 2011/0320545 A1 | 12/2011 | Hammer et al. | |
| 2012/0077467 A1 | 3/2012 | Fan et al. | |
| 2012/0226748 A1* | 9/2012 | Bosworth | H04L 12/1813 709/204 |
| 2012/0297463 A1 | 11/2012 | Orbach et al. | |
| 2012/0324008 A1* | 12/2012 | Werz, III | G06Q 30/02 709/204 |
| 2013/0066706 A1* | 3/2013 | Wu | G06Q 30/0242 705/14.42 |
| 2013/0103503 A1* | 4/2013 | Zhang | G06Q 10/10 705/14.66 |
| 2013/0117364 A1* | 5/2013 | Bania | G06Q 30/02 709/204 |
| 2013/0311565 A1* | 11/2013 | Barry | H04L 67/22 709/204 |

* cited by examiner

*Primary Examiner* — June Y Sison
(74) *Attorney, Agent, or Firm* — Pepper Hamilton LLP

(57) ABSTRACT

A system and method for regulating the flow of an electronic message in a social network comprises: creating the electronic message posted by a user in a social network, associating various permissions with the electronic message, notifying the user, information relating to flow of the electronic message from the user in the social network to other user, creating the path of the electronic message flow from the user in the social network to the other user and traversing the path of the electronic message flow from the user in the social network to the other user.

18 Claims, 8 Drawing Sheets

| 502 | 504 | 506 | 508 | 510 |
|---|---|---|---|---|
| MESSAGE IDENTIFIER | MESSAGE CONTENT | MESSAGE FILTER CRITERIA | MESSAGE CONFIGURATION RULES | MESSAGE HOP DETAILS |
| 1234 | 10% off on Product x | Geography = India. Gender = Male. | Forward = Yes | A-> B<br>B-> C<br>C-> D<br>B-> C |

FIGURE 5

FRAMEWORK TO CONTROL AND MEASURE THE FLOW OF MESSAGES

This application claims the benefit of Indian Patent Application Serial No. 5991/CHE/2013 filed Dec. 20, 2013, which is hereby incorporated by reference in its entirety.

FIELD

This disclosure relates generally to messaging in social network and, more particularly, the method for regulating the flow of electronic messages in private and public social network.

BACKGROUND

With the advent of digital communication and social networking sites, more and more of our social interactions has become through these social networking sites. The technology is also available to provide a communication infrastructure enabling fast, efficient and reliable transport of this information from the providers of information.

The word of mouth distribution of information, i.e. passing information from person to person, constitutes another channel to assist users in identifying information of interest to them. A user who knows the information tells it to his friends, who then tell it to their friends and so on.

Several researchers have explored social networks for designing algorithms for spreading messages by finding influential users and communities. One popular practice employed by many brands is to broadcast the same message to multiple users. However, the broadcast method would not scale with increasing number of messages, as the users will start considering the broadcast messages as spam and ignore the messages.

One method is to select a certain number of people having the most friends. However, people selected by this method frequently are in the same social community and circle of friends and only cover a portion of the entire social network. Therefore, this method usually does not reach the maximum coverage. Another way of finding influencers is to try all combinations of a certain number of people that will maximize the spreading of the electronic message. However, this requires an inordinate amount of computation time, and therefore is not a feasible alternative. Therefore, there is a need for a method to control and measure flow of electronic message in the social network by identifying key influencer responsible for spreading the messages.

SUMMARY

Disclosed are a method and/or a system to regulate the flow of electronic messages in a social network.

In one aspect, a method for regulating the flow of electronic messages in a social network includes creating by a processor, the electronic message posted by a user in a social network, associating various permissions with electronic message, notifying the user information relating to flow of electronic message from the user to other user, creating by the processor, path of the electronic message flow from the user to the other user and traversing by the processor path of the electronic message flow from the user to other user in the social network.

The method of electronic message flow regulation may include permissions associated with the electronic message such as message flow restriction, message visibility, follow of messages based on who has opted out to receive such messages and operations performed by the user in the social network. Message flow from the user to the other user may be based on profile. The operation that may be performed on the message by the user comprises one of: forward, delete and modify.

In another aspect, the method of regulating flow of electronic messages includes tracking spread of electronic messages by determining a hop distance based on number of hops the message traversed in the social network.

In another aspect, a system for regulating the flow of an electronic message in a social network includes creating by a processor, the electronic message posted by a user in a social network, associating various permissions with the electronic message, notifying the user information relating to flow of the electronic message from the user to other user, creating by the processor, path of the electronic message flow from the user to the other user and traversing by the processor path of the electronic message flow from the user to other user in the social network.

The system of regulating flow of electronic message may include permissions associated with the electronic message such as message flow restriction, message visibility, follow of messages based on who has opted out to receive such messages and operations performed by the user in the social network. Message flow from the user to other user may be based on profile and the operation that may be performed by user comprises one of: forward, delete and modify.

BRIEF DESCRIPTION OF THE DRAWINGS

Example embodiments are illustrated by way of example and not limitation in the figures of the accompanying drawings, in which like references indicate similar elements and in which:

FIG. 5 is a diagrammatic representation of logical structure of the electronic message, according to one or more embodiment.

Figure 1:
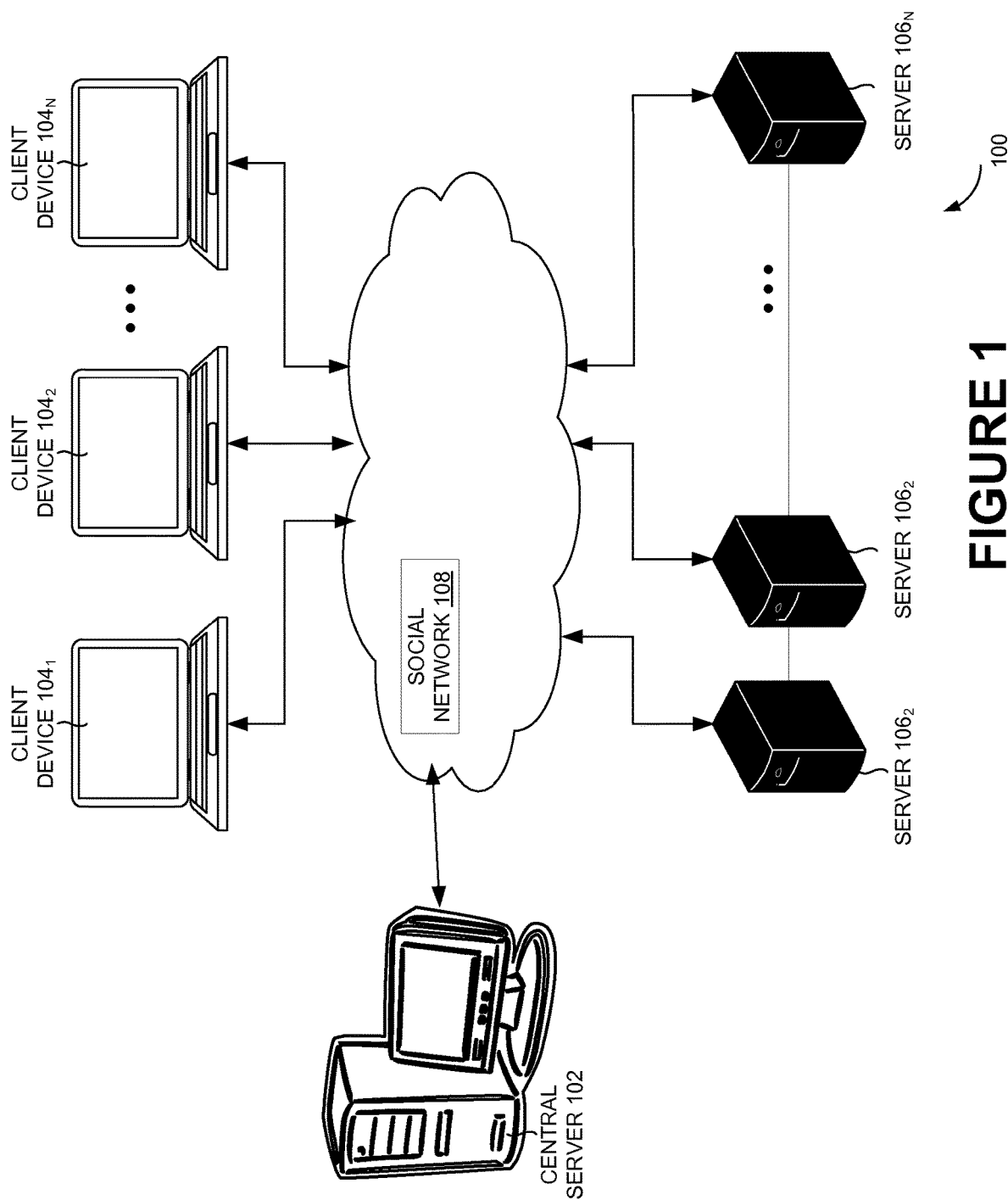
FIG. 1 is a system diagram of one embodiment.

Other features of the present embodiments will be apparent from the accompanying drawings and from the detailed description that follows.

DETAILED DESCRIPTION

Example embodiments, as described below, may be used to provide a method, a framework to control and measure the flow of message in a social network. Although the present embodiments have been described with reference to specific example embodiments, it will be evident that various modifications and changes may be made to these embodiments without departing from the broader spirit and scope of the various embodiments.

A social network may be a software application and/or a web site configured for maintaining profiles of users and associations between the users. The users typically enjoy a personal computer-implemented space enabling them to maintain a personal profile. A user may also typically communicate and conveniently share information with other users with whom the user may be associated in the social network. The social network application or, simply, social network may be referred as online social network. The social network may also be referred as 'Environment' in the foregoing description.

In one or more embodiment, the method will be described from the perspective of one or more users of the social network.

In one or more embodiments, information may be the electronic message being conveyed between the users of the social network.

In one or more embodiments, an electronic message may be an instant text message, video, audio or image shared between two or more users over the social network.

In one or more embodiments, a profile may be a collection of personal data and user-related information associated to a specific user.

In an example embodiment, user profiles may contain personal identification information such as name, address and/or email. In addition, demographic elements that may describe the users of the social network (e.g. age and geography). Further, user profiles may also contain groups that the users of the social network belong to, and other user-related information such as activities that user may perform, pictures that display users of the social network, likes/dislikes of the users, interests of the users, etc. other sets of information may be included in the definition of the user's profile, groups that the user of the social network has joined, dynamic context information, and so on.

The embodiments herein disclose a system and method for regulating flow of electronic messages in a social network.

In a social network, interactions between users play an important role in identifying key influencer. Influencer may be the user who has maximum number of friends to whom the message may be forwarded to. When a user of the social network receives an electronic message, the user has the option of sharing and/or forwarding the electronic message to his friends. The electronic message flows from the user to other user in a cascading manner. Any electronic message posted in the social networking site may be viewed by some of the users and circulated to other users through the social network using e-mail, blog-post, by word of mouth or by any other information transfer means. Thus, it is crucial to determine influencer responsible for viral nature of the electronic message.

FIG. 1 illustrates an exemplary communication network 100. As shown, communication network 100 of FIG. 1 includes social network 108, central server 102, servers 106(1-N) and client devices 104(1-N). In one embodiment, a plurality of client devices 104(1-N) are communicating with each other via a social network 108. It should be noted that the social network 108 is not limited to a particular type of network. For example, the social network 108 may be implemented as a public network (e.g., the Internet) or a private network (e.g., a local area network). For example, the social network 108 may broadly comprise: a packet network, a circuit-based network, a cellular or wireless network, an access network, a Voice over Internet Protocol (VoIP) network, and the like.

Generally, client devices 104(1-N) may include a mobile computing device capable of receiving and sending an electronic message over a network, such as social network 108, or the like. Such client devices include portable devices such as cellular telephones, smart phones, Personal Digital Assistants (PDAs), handheld computers, laptop computers, tablet computers, or the like.

In one embodiment, a service provider may provide communication services via a network, e.g., a core network service provider, a cellular network service provider, an access network service provider, a local telephone network service provider, a cable network service provider and the like. In one embodiment, the service provider may employ a server 102 (e.g., an application server). Broadly defined, server 102 may be capable of defining a social network for a user, wherein the user may be a customer of the service provider.

Figure 2:
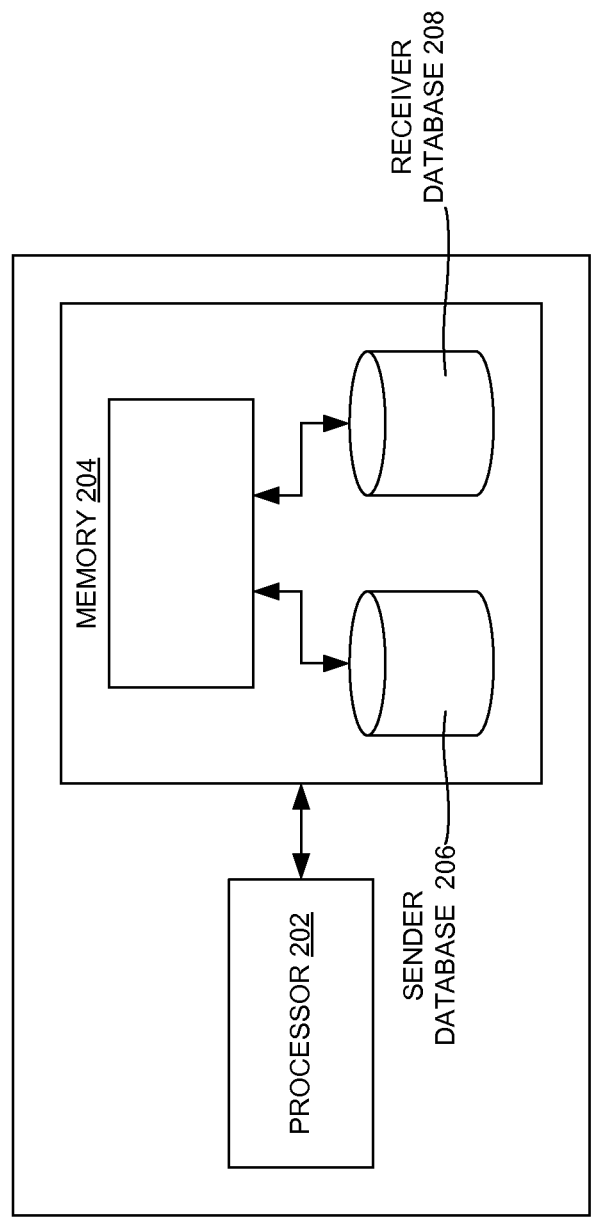
FIG. 2 shows implementation of an exemplary embodiment.

In one or more embodiments, as shown in FIG. 2, a processor 202 may be connected to a memory 204, a sender database 206 and receiver database 208. A user creates an electronic message in a social network 108 and associates various rules or permissions with it using the processor 202. The electronic message sent may be stored in the sender database 206. The user has the option to share and/or forward the electronic message with other users in the social network 108. The electronic message shared and/or forwarded may be stored in the receiver database 208. When the user requests the processor 202 to display the electronic message available, the processor 202 retrieves the electronic message from the memory 204 and displays it on the client device 104(1-N).

Figure 3:
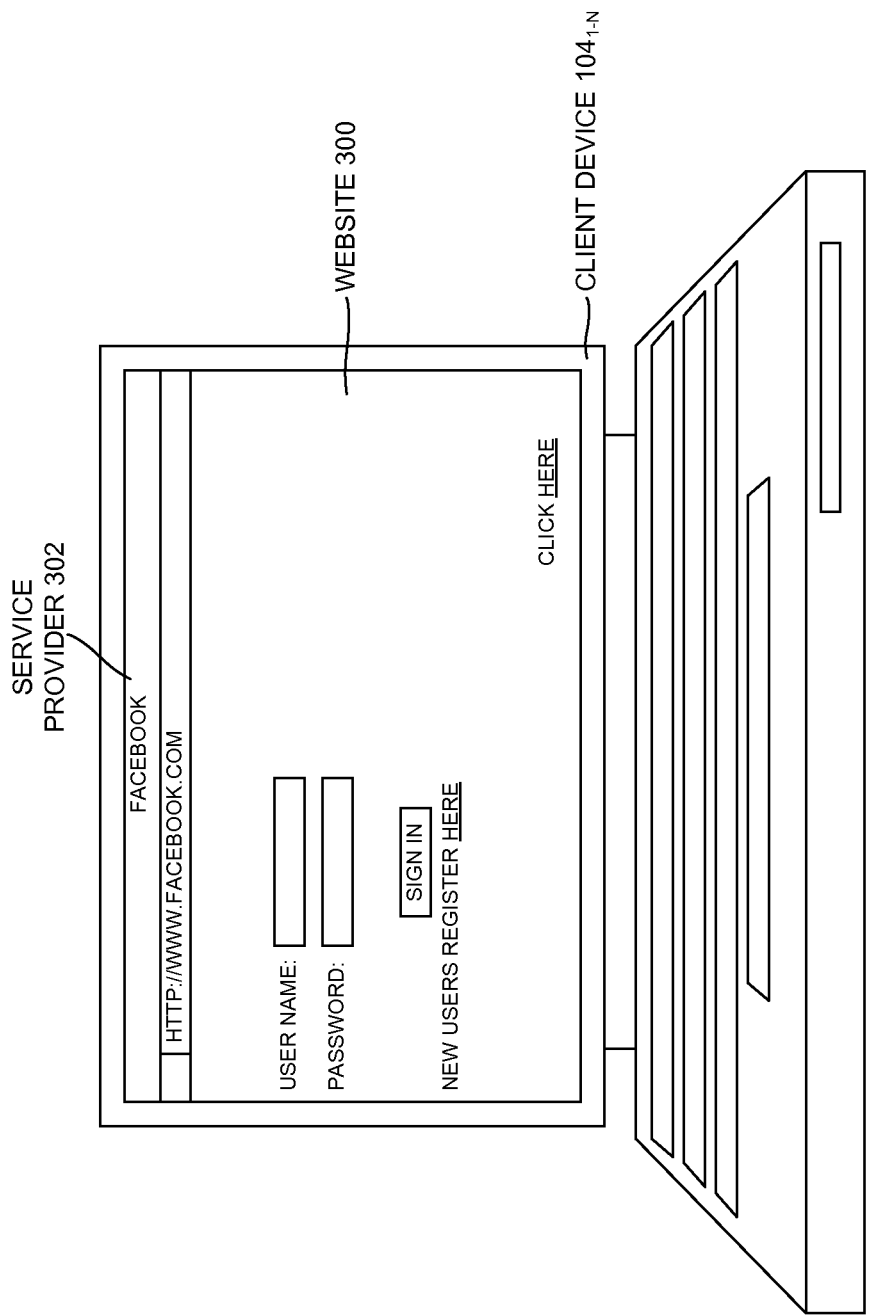
FIG. 3 is a user interface of one of the client devices in the social network, according to one embodiment.

In one or more embodiments, user logs into a website 300 hosted by a service provider 302 from the client device 104(1-N) as shown in FIG. 3.

Figure 4:
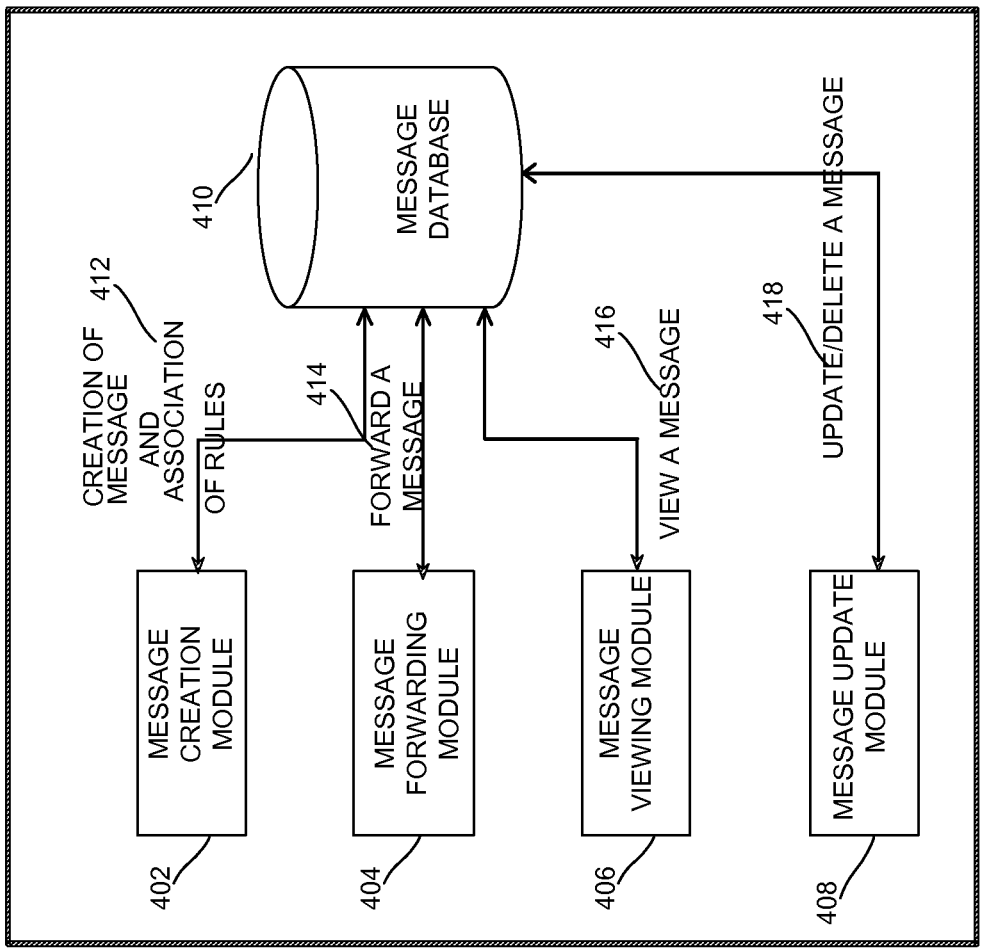
FIG. 4 illustrate detailed implementation of system and method for regulating flow of electronic messages in the social network, according to one embodiment.

In another example embodiment, as described in detail in FIG. 4, a user interacts with a message creation module 402 to create an electronic message and post it on the website 300. The user creates the message and associates various rules or permissions with the electronic message as shown in step 412. The message may be stored in a message database 410. The rules associated with the electronic message may be at least one of: restrict the flow of electronic message, restrict the visibility of the electronic message, share and/or forward the electronic message with the other users based on a profile (i.e. age, geography, language), restrict the follow of electronic message based on who has opted out to receive electronic messages and operations that one may perform on the electronic message such as forward, delete or modify.

The user may share and/or forward the electronic message with the other users in the social network 108. The user may forward the message at step 414. As the electronic message flows from the user to the other user, a message forward module 404 sends a notification 500 to the creator of the electronic message. The notification 500 comprises of a sender name, a receiver name, a message identifier, a time stamp and an environment. Time stamp may be the time at which electronic message was sent or received.

A path flow of the electronic message could be traversed by the processor 202 using information contained in the notification 500 sent to the creator of the electronic message. The electronic message could be traversed to perform at least one of the following: replace the electronic message, modify the electronic message, add extra content to the electronic message, delete the electronic message and hide or unhide the electronic message.

The user receives the electronic message in a message database 410. In response to the electronic message received in the message database 410, the user requests the message database 410 to view the message at step 416. A message viewing module 406 retrieves it from the message database 410 and displays it to the user on the client device 104(1-N) based on the rules associated with the electronic message.

The user may perform at least one of the operations on the electronic message such as forward, delete or modify. The user may update/delete the message at step 418. All the changes are updated by a message update module 408 and are reflected in the message database 410.

The user of the electronic message may change the permissions associated with the electronic message during the life time of the electronic message and in such case the message update module 408 enforces the change.

In one or more embodiments, a message identifier may be a unique number generated and/or associated with an electronic message during the process of message creation.

In an alternative embodiment, one or more client devices 104(1-N) receiving and/or forwarding an electronic message may determine a hop distance. The hop distance may be computed using a variety of ways, including, for example, including with the electronic message, information about a number of hops the electronic message traversed to reach a recipient; sending a notification 500 back through a chain of forwarding client devices where the notification 500 may be used to determine the hop distance; or any of a variety of other ways. Alternatively, the hop distance may be determined using any of the standard techniques. The hop distance may be used to traverse the path flow of electronic message for controlling the electronic message flow in a social network 108.

FIG. 5 shows logical structure of an electronic message. In one or more embodiments, a message identifier 502 may be a unique number generated for each electronic message during the process of message creation. Further, message content 504 may be information of interest to the user. For instance, the electronic message will be forwarded to a large number of users depending on how interesting the message content 504 may be to the user. A message filter criteria 506 may be the rules or permission associated with the electronic message, for instance, the electronic message could be forwarded to other user based on at least one of the: age, geography or language. A message configuration rule 508 describes whether or not the electronic message could be forwarded to a particular user. A message hop details 510 may be the path of message flow from one user to the other user.

In one or more embodiments, the electronic message may be forwarded to other user according to the message filter criteria. The user of the electronic message may define the filter criteria for the electronic message. Alternatively, the message filter criteria may be determined automatically by the processor 202.

In an example embodiment, a user creates and posts an electronic message on a website 300 in a social network 108. Various rules or permissions are associated with the electronic message. The electronic message may be shared and/forwarded to other user in the social network 108 based on a message filter criteria 506 defined by the user. The message filter criteria 506 may be age, geography, language or gender. For instance, the user posts the electronic message about 10% off on product 'x' (message content 504) and defines the message filter criteria 506 to be forward the electronic message to the other user if geography is India and gender is male as shown in FIG. 5. The flow of the electronic message from the user to the other user may be tracked by the processor 202. Later, when the user wants to post the electronic message relating to product 'x' or the like, a group of users interested in the product 'x' may be known by learning module and the electronic message may be forwarded to the group of users automatically by the processor 202.

Figure 6:
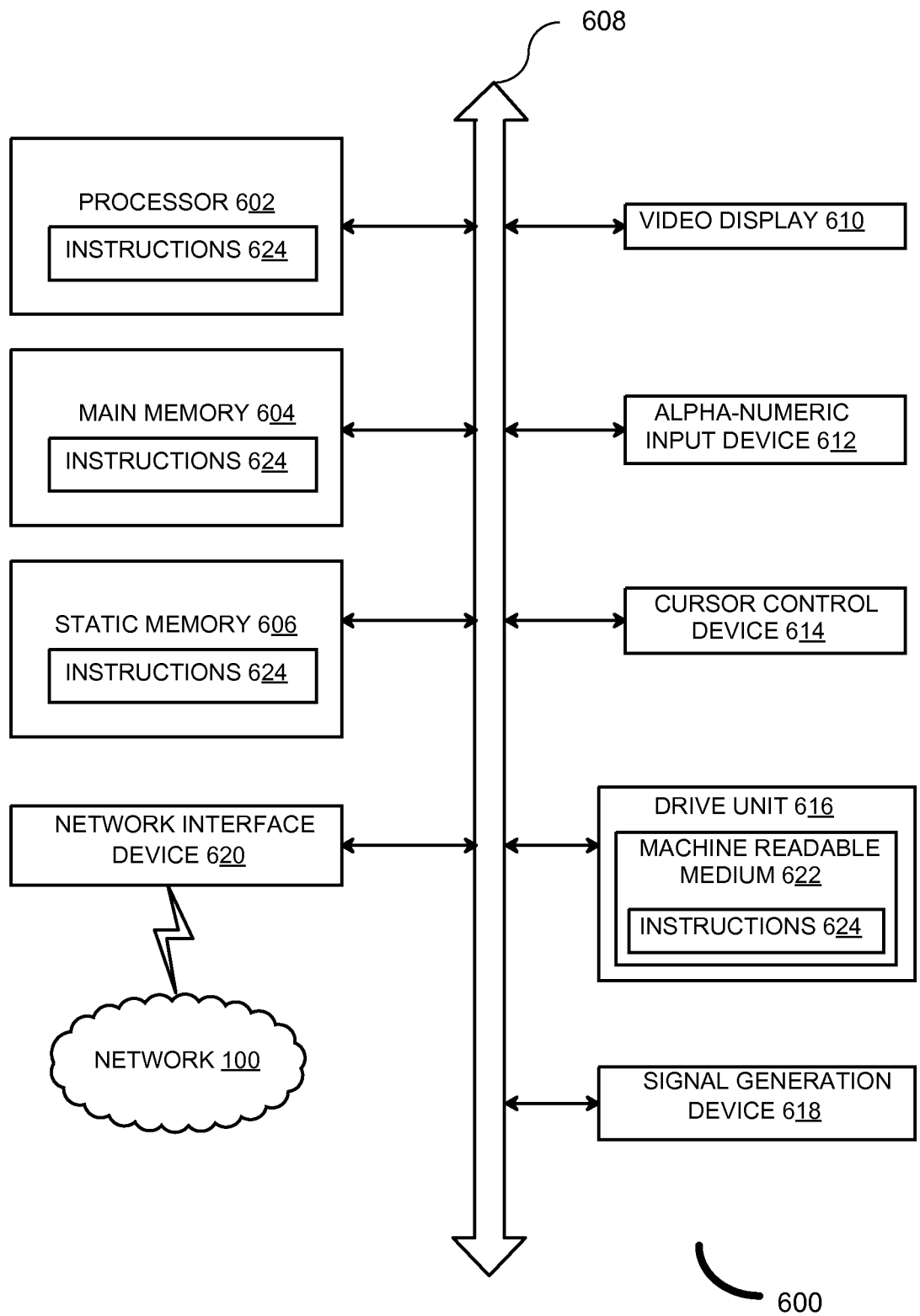
FIG. 6 is a diagrammatic representation of a data processing system capable of processing a set of instructions to perform any one or more of the methodologies herein, according to one embodiment.

FIG. 6 is a diagrammatic representation of a data processing system capable of processing a set of instructions to perform any one or more of the methodologies herein, according to an example embodiment. FIG. 6 shows a diagrammatic representation of machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal displays (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies and/or functions described herein. The instructions 624 may also reside, completely and/or at least partially, within the main memory 604 and/or within the processor 602 during execution thereof by the computer system 600, the main memory 604 and the processor 602 also constituting machine-readable media.

The instructions 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 7:
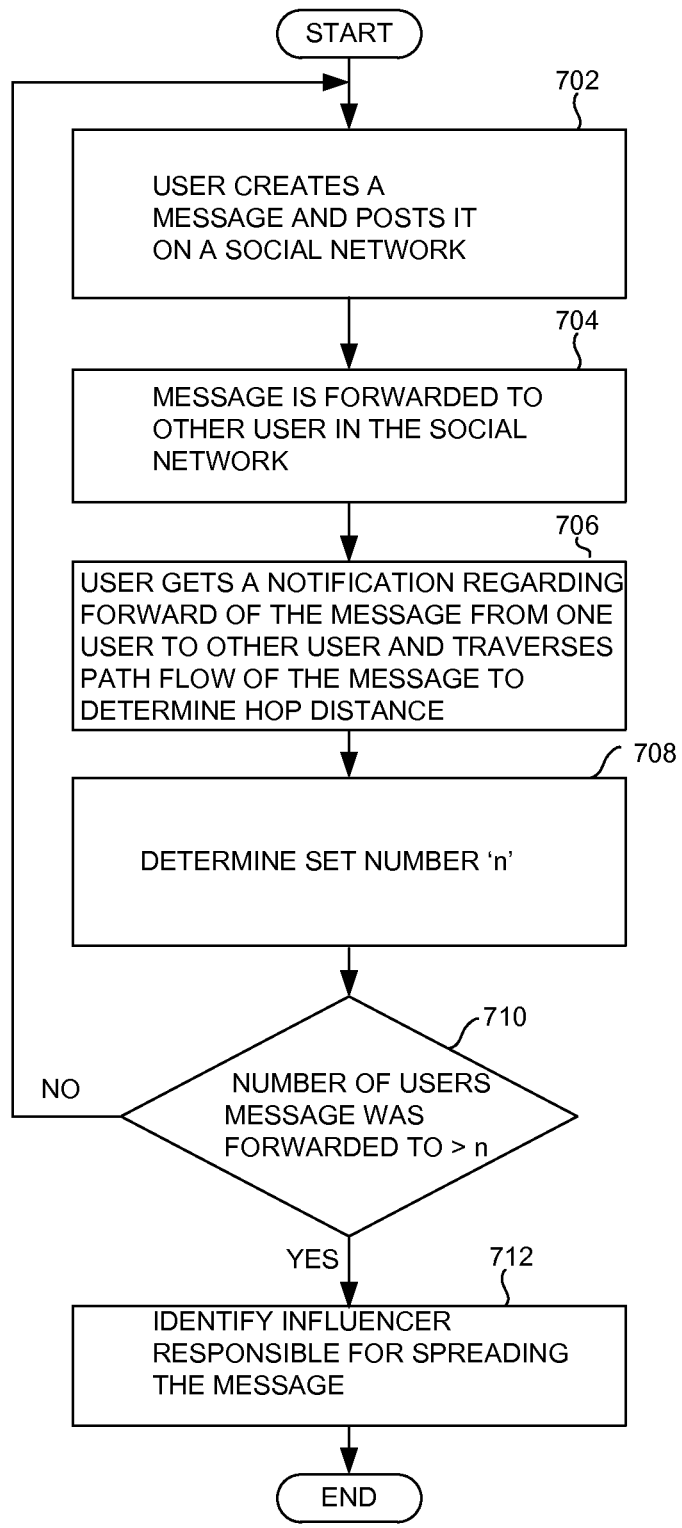
FIG. 7 is a flow chart of the system for measuring and controlling flow of electronic message in the social network.

FIG. 7 shows flow chart illustrating one embodiment of the invention. At step 702, user creates an electronic message and posts it on a social network 108. The user may choose to forward the electronic message to other user in the social network 108 at step 704. When the electronic message may be forwarded from the user to the other user in the social network 108, processor 202 sends a notification 500 to the creator of the electronic message as shown in step 706. Notification 500 comprising of information may be used to traverse the path flow of the electronic message in the social network 108, thus determining the hop distance.

Next, a set number 'n' may be defined by the user at step 708. The set number corresponds to certain number of users to whom the electronic message may be forwarded to. In one embodiment, this set number may be defined by the user of the system 100 shown in FIG. 1. Alternatively, the set number may be determined automatically by the system 100.

In step 710, a determination may be made by the processor 202 whether the number of users the electronic message was forwarded to is greater than set number 'n'. If so, then identifying influencer responsible for spreading the electronic message in the social network 108 or the electronic message going viral in nature at step 712.

In an exemplary embodiment, a user defines the set number to be 'n'. Processor 202 determines whether the electronic message was forwarded to more than 'n' users. If so, then an influencer responsible for spreading the electronic message is identified. Influencer may be the user who may have maximum number of friends in the path of electronic message flow.

Figure 8:
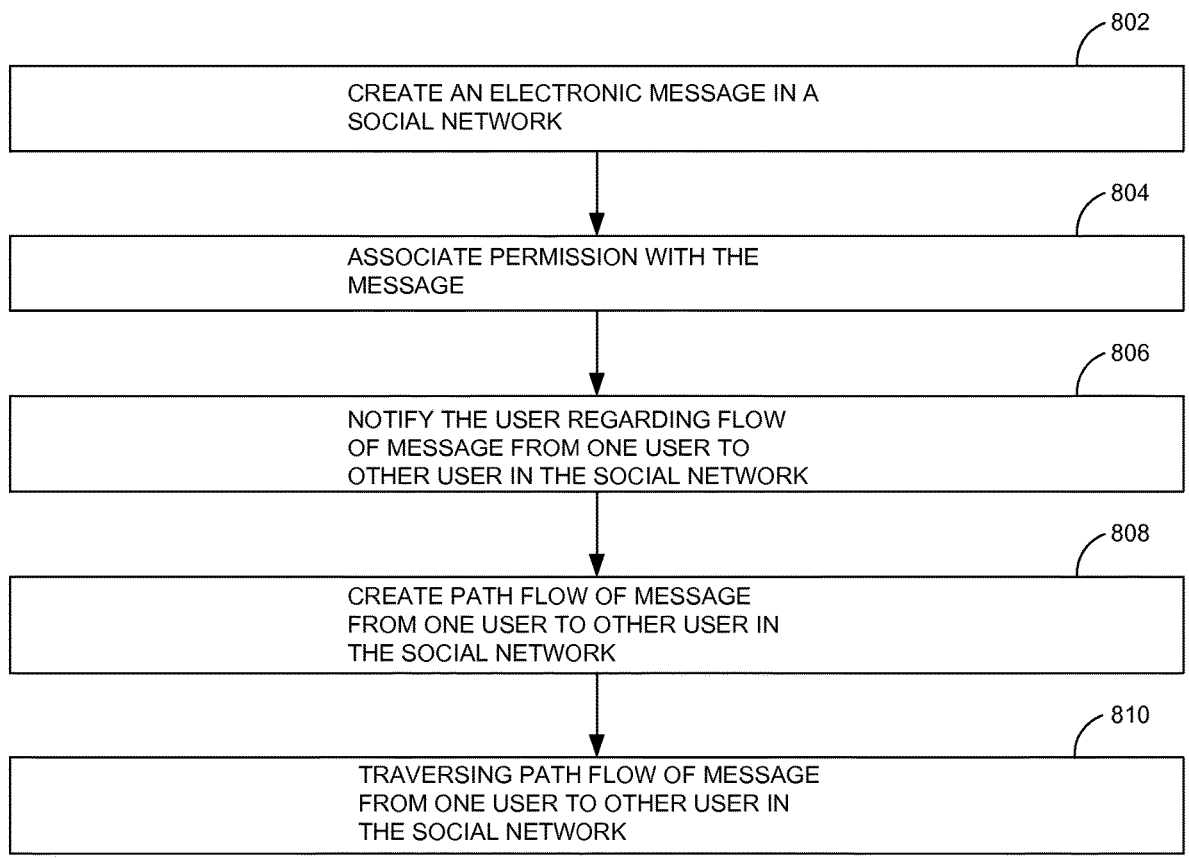
FIG. 8 is a process flow diagram of the method to regulate flow of electronic message in the social network, according to one embodiment.

FIG. 8 describes logical flow diagram illustrating detailed operation of the method used by system 100 in an exemplary embodiment as shown in FIG. 1. The method begins at block 802 by creating an electronic message in the social network 108. Rules or permissions are associated with the electronic message by a processor 202 at block 804. As the electronic message flows from a user to other user in the social network 108, the processor 202 sends a notification 500 to the user of the electronic message at block 806. The processor 202 establishes path flow of the electronic message at block 808 and traverses the path of the electronic message at block 810 to determine a hop distance. Thus, the flow of the electronic message in the social network is regulated.

What is claimed is:

1. A method for regulating flow of an electronic message in a network comprising:
   creating, by a message management computing device, the electronic message posted by a first client device in a social network and transmitting the created electronic message to a second client device;
   associating, by the message management computing device, one or more permissions with the created electronic message, wherein one of the one or more permissions includes restricting visibility of the electronic message;
   notifying, by the message management computing device, the first client device information relating to a flow of the created electronic message from the first client device in the social network to the second client device when the created electronic message is transmitted to a plurality of other client devices from the second client device, and wherein the created electronic message is modified by the plurality of other client devices during the transmission and wherein the flow of the electronic message from the first client device to the second client device in the social network is based on age, geography and language;
   creating, by the message management computing device, a path of the electronic message flow from the first client device in the social network to the plurality of other client devices upon notifying the first client device; and
   traversing, by the message management computing device, the created path of the electronic message flow from the first client device in the social network to the plurality of other client devices to identify one or more influencer computing devices from the second client device and the plurality of other client devices, responsible for transmitting the created electronic message in the social network greater than a threshold value, wherein the created electronic message is modified while traversing the created path; and
   providing, by the message management computing device, data associated with the identified one or more influencer computing devices to the first client device, wherein the creating, traversing, and providing in response to notifying the first client device information.

2. The method of claim 1, wherein the associating various permissions to the electronic message further comprises:
   message flow restriction, message visibility, follow of messages based on who has opted out to receive such messages and operations performed by the first client device in the social network.

3. The method of claim 2, wherein the electronic message flows from the first client device in the social network to the second client device based on profile comprising a name, an address, or an email.

4. The method of claim 2, wherein the operations further comprises at least one of: forward, delete or modify, wherein a number of times the electronic message forwarded identifies the one or more influencer computing devices.

5. The method of claim 2, wherein the message flow restriction further comprises flow of the electronic message from at least one of the social network to the other.

6. The method of claim 1, wherein the flow of the electronic message from the first client device to the second client device in the social network is defined by the electronic message posted in the social network.

7. The method of claim 1, wherein notifying the first client device, information relating to flow of the electronic message from the first client device to the second client device comprises:
   a sender name, a receiver name, a message identifier, a time stamp and an environment.

8. The method of claim 1, wherein the path of the electronic message flow from the first client device to the second client device in the social network is traversed to perform at least one of replace the electronic message, modify the electronic message, delete the electronic message stored in a memory, hide the electronic message or add content to the electronic message.

9. The method of claim 1, wherein the permissions associated with the electronic message can be modified during lifetime of the electronic message.

10. The method as set forth in claim 1 further comprising tracking the spread of electronic message in a social network by determining a hop distance based on a number of hops the electronic message traversed in the social network.

11. A message management computing device comprising:
a processor;
a memory, wherein the memory coupled to the processor which are configured to execute programmed instructions stored in the memory storing executed instructions performing steps comprising:
creating the electronic message posted by a first client device in the social network;
associating one or more various permissions with the created electronic message, wherein one of the one or more permissions includes restricting visibility of the electronic message;
notifying the first client device information relating to a flow of the created electronic message from the first client device in the social network to the second client device when the created electronic message is transmitted to a plurality of other client devices from the second client device, and wherein the created electronic message is modified by the plurality of other client devices during the transmission and wherein the flow of the electronic message from the first client device to the second client device in the social network is based on age, geography and language;
creating a path of the electronic message flow from the first client device in the social network to the plurality of other client devices upon notifying the first client device;
traversing the created path of the electronic message flow from the first client device in the social network to the plurality of other client devices to identify one or more influencer computing devices from the second client device and the plurality of other client devices responsible for transmitting the created electronic message in the social network greater than a threshold value, wherein the created electronic message is modified while traversing the created path; and providing data associated with the identified one or more influencer computing devices to the client device, wherein the creating, traversing, and providing in response to notifying the first client device information.

12. The device of claim 10, wherein associating various permissions with the electronic message comprises message flow restriction, message visibility, follow of messages based on who has opted out to receive such messages and operations performed by the first client device.

13. The device of claim 11, wherein the electronic message flows from the first client device to the second client device in the social network based on profile comprising a name, an address, or an email.

14. The device of claim 11, wherein the operations that can be performed comprises at least one of: forward, delete or modify, wherein a number of times the electronic message forwarded identifies the one or more influencer computing devices.

15. The device of claim 13, wherein the flow of electronic message from the first client device to the second client device in the social network is defined by the electronic message posted in the social network.

16. The device of claim 10, wherein notifying the first client device, information relating to flow of electronic message from the first client device to the second client device includes: a sender name, a receiver name, a message identifier, a time stamp or an environment.

17. The device of claim 10, wherein the path of the electronic message flow from the first client device to the second client device in the social network is traversed to perform at least one of replace the electronic message, modify the electronic message, delete the electronic message stored in the memory, hide the electronic message, or add content to the electronic message.

18. The device of claim 10, wherein the permissions associated with the electronic message can be modified during lifetime of the electronic message.

* * * * *